US012700962B2

(12) United States Patent
Kazmi et al.

(10) Patent No.: US 12,700,962 B2
(45) Date of Patent: Aug. 4, 2026

(54) ACTIVATING POSITIONING SRS DURING DRX INACTIVE TIME

(71) Applicant: Telefonaktiebolaget LM Ericsson (publ), Stockholm (SE)

(72) Inventors: Muhammad Ali Kazmi, Sundbyberg (SE); Iana Siomina, Täby (SE); Stefan Fritze, Rosenheim (DE); Magnus Larsson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 405 days.

(21) Appl. No.: 18/020,022

(22) PCT Filed: Aug. 2, 2021

(86) PCT No.: PCT/IB2021/057068
§ 371 (c)(1),
(2) Date: Feb. 6, 2023

(87) PCT Pub. No.: WO2022/029607
PCT Pub. Date: Feb. 10, 2022

(65) Prior Publication Data
US 2023/0283425 A1 Sep. 7, 2023

Related U.S. Application Data

(60) Provisional application No. 63/062,967, filed on Aug. 7, 2020.

(51) Int. Cl.
*H04L 5/00* (2006.01)
*H04W 76/28* (2018.01)

(52) U.S. Cl.
CPC ........... *H04L 5/0048* (2013.01); *H04W 76/28* (2018.02)

(58) Field of Classification Search
None
See application file for complete search history.

(56) References Cited

U.S. PATENT DOCUMENTS

2021/0385766 A1* 12/2021 Manolakos ....... H04W 52/0274
2022/0046748 A1* 2/2022 Cui ..................... H04W 56/002

FOREIGN PATENT DOCUMENTS

| JP | 2016500214 A | 1/2016 |
| JP | 2016502651 A | 1/2016 |
| JP | 2016504800 A | 2/2016 |

(Continued)

OTHER PUBLICATIONS

Ericsson, "Email discussion summary for [95e][217] NR_pos_RRM_Part 3", 3GPP TSG-RAN WG4 Meeting #95-e, R4-2009029, Electronic Meeting, May 25-Jun. 5, 2020.

(Continued)

*Primary Examiner* — Diane L Lo

(57) ABSTRACT

The present application describes devices, systems, and methods for transmitting certain signals by a user equipment, UE (510), during a discontinuous reception, DRX, inactive time. An exemplary method includes receiving configuration information indicating a status associated with a reception, by a radio node, of a sounding reference signal, SRS, during a DRX inactive time and selectively transmitting, to the radio node, the SRS during the DRX inactive time based at least in part on the status.

23 Claims, 9 Drawing Sheets

DETERMINE WHETHER THE WIRELESS DEVICE IS ALLOWED TO TRANSMIT A SOUND REFERENCE SIGNAL (SRS) TO A PRIMARY NODE DURING THE DRX INACTIVE TIME
142

TRANSMIT SRS TO THE PRIMARY NODE DURING THE DRX INACTIVE TIME WHEN IT IS DETERMINED THAT THE WIRELESS DEVICE IS ALLOWED TO TRANSMIT THE SRS TO THE PRIMARY NODE DURING THE DRX INACTIVE TIME
144

(56)            References Cited

FOREIGN PATENT DOCUMENTS

JP          2023505678 A     2/2023

OTHER PUBLICATIONS

Ericsson, "SRS for positioning during DRX inactive time", 3GPP TSG RAN WG4 Meeting #96-e, R4-2011249, Electronic Meeting, Aug. 17-28, 2020.

Huawei et al., "Remaining issues in the MAC spec", R2-2005092, Electronic meeting, Jun. 1-12, 2020.

RAN2, "LS on positioning SRS during DRX inactive time", 3GPP TSG RAN WG 4 Meeting #95-e, TDoc R4-2008286. Electronic Meeting, May 25-Jun. 5, 2020.

Huawei et al., "Summary for MAC proposals under 6.8.2.5", 3GPP TSG-RAN WG2 109bis-e, R2-2004208, Electronic Meeting, Apr. 20-30, 2020.

Huawei, "[draft] reply LS on positioning SRS during DRX inactive time", 3GPP TSG-RAN WG4 Meeting #95-e, R4-2008674, Electronic Meeting, May 25-Jun. 5, 2020.

* cited by examiner

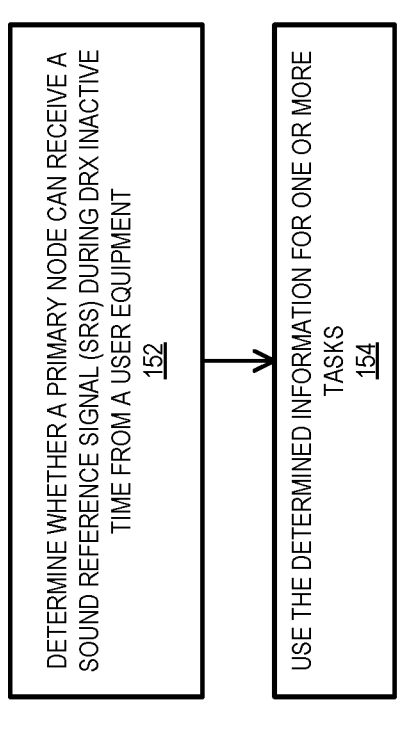

DETERMINE WHETHER A PRIMARY NODE CAN RECEIVE A SOUND REFERENCE SIGNAL (SRS) DURING DRX INACTIVE TIME FROM A USER EQUIPMENT
152

USE THE DETERMINED INFORMATION FOR ONE OR MORE TASKS
154

*FIG. 15*

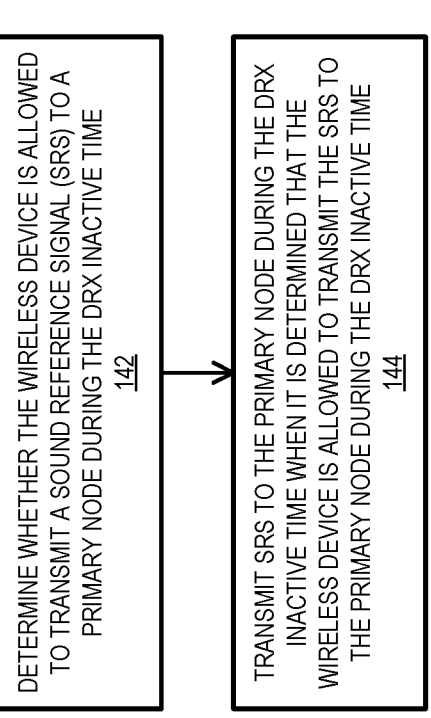

DETERMINE WHETHER THE WIRELESS DEVICE IS ALLOWED TO TRANSMIT A SOUND REFERENCE SIGNAL (SRS) TO A PRIMARY NODE DURING THE DRX INACTIVE TIME
142

TRANSMIT SRS TO THE PRIMARY NODE DURING THE DRX INACTIVE TIME WHEN IT IS DETERMINED THAT THE WIRELESS DEVICE IS ALLOWED TO TRANSMIT THE SRS TO THE PRIMARY NODE DURING THE DRX INACTIVE TIME
144

*FIG. 14*

ACTIVATING POSITIONING SRS DURING DRX INACTIVE TIME

RELATED APPLICATIONS

This application is a national phase application of International Patent Application No. PCT/IB2021/057068, filed Aug. 2, 2021, which claims the benefit of U.S. Provisional Patent App. No. 63/062,967, filed Aug. 7, 2020, the disclosures of which are hereby incorporated herein by reference in their entirety.

TECHNICAL FIELD

The present disclosure relates generally to communications, and more particularly to communication methods and related devices and nodes supporting wireless communications.

BACKGROUND

Positioning in NR

NR (a.k.a. 5G or Next Generation) architecture is being discussed in 3GPP and the current concept is illustrated in FIG. 1, where gNB and ng-eNB (or evolved eNB) denote NR BSs (one NR BS may correspond to one or more transmission/reception points, TRPs), and the lines between the nodes illustrate the corresponding interfaces.

LMF is the location node in NR. There are also interactions between the location node and the gNB via the NRPPa protocol (not illustrated in FIG. 1) and between UE and the location server via NR LPP. The interactions between the gNB and the UE are supported via the Radio Resource Control (RRC) protocol.

BS Measurements for Positioning

In NR several uplink positioning measurements which can be performed by the radio node (e.g., BS, LMU, etc.) are specified. Examples of such measurements are measurements related to received signal level, timing and angle of arrival (AoA). All these measurements are performed or at least one component of these measurements is performed by the radio node on at least uplink signals transmitted by the UE whose positioning is to be determined. Examples of the UL signals are reference signals such as SRS. The uplink positioning measurement may be performed by the UE's serving radio node(s), one or more neighbor radio nodes or serving as well as one or more neighbor radio nodes.

An example of measurement related to received signal level is UL SRS reference signal received power (UL SRS-RSRP). It is the average power contributions of the resource elements carrying sounding reference signals (SRS).

A timing measurement used for UE positioning can be unidirectional or it can be bidirectional. An example of unidirectional timing measurement is UL Relative Time of Arrival (UL RTOA), which is used by the radio node for measuring transmit timing of signal transmitted by UE. UL RTOA is the beginning of subframe i containing SRS received in positioning node j, relative to the RTOA Reference Time. An example bi-directional timing measurement is gNB Rx-Tx time difference, which is used by the radio node for measuring relation between the transmit timing (Tx) of signal transmitted by the radio node to the UE and the reception timing (Rx) of signal received at the radio node from the UE. More specifically gNB Rx-Tx time difference is defined as:

TgNB-RX–TgNB-TX, where TgNB-RX is the positioning node received timing of uplink subframe #i containing SRS associated with UE, defined by the first detected path in time. It is measured on SRS signals received from the UE, and TgNB-TX is the positioning node transmit timing of downlink subframe #j that is closest in time to the subframe #i received from the UE. It is measured on PRS signals transmitted by gNB.

Other examples of bidirectional measurements are eNB measurements such as Timing Advance Type 1 and Timing Advance Type 2, as were specified in LTE (TS 36.214 v16.1.0).

An example of measurement related to AoA is UL Angle of Arrival (UL AoA), which is defined as the estimated azimuth angle and vertical angle of a UE with respect to a reference direction.

Reference Signals for Positioning Measurements

Positioning Reference Signals

Positioning reference signal (PRS) are periodically transmitted on a positioning frequency layer in PRS resources in the DL by the gNB. The information about the PRS resources is signaled to the UE by the positioning node via higher layers but may also be provided by base station e.g., via broadcast. Each positioning frequency layer comprises PRS resource sets, where each PRS resource set comprises one or more PRS resources. All the DL PRS resources within one PRS resource set are configured with the same periodicity. The PRS resource periodicity (TperPRS) comprises:

$$T_{per}^{PRS} \in 2^{\mu}\{4, 8, 16, 32, 64, 5, 10, 20,$$
$$40, 80, 160, 320, 640, 1280, 2560, 5120, 10240, 20480\}$$

where $\mu$=0, 1, 2, 3 for PRS SCS of 15, 30, 60 and 120 kHz respectively.

$$T_{per}^{PRS} = 2^{\mu} \cdot 20480$$

is not supported for $\mu$=0.

Each PRS resource can also be repeated within one PRS resource set and takes values $$T_{per}^{PRS} \in \{1, 2, 4, 6, 8, 16, 32\}.$$

PRS are transmitted in consecutive number of symbols ($L_{PRS}$) within a slot: $L_{PRS} \in \{2,4,6,12\}$. The following DL PRS RE patterns, with comb size KPRS equal to number of symbols LPRS are supported Comb-2: Symbols {0, 1} have relative RE offsets {0, 1}
Comb-4: Symbols {0, 1, 2, 3} have relative RE offsets {0, 2, 1, 3}
Comb-6: Symbols {0, 1, 2, 3, 4, 5} have relative RE offsets {0, 3, 1, 4, 2, 5}
Comb-12: Symbols {0, 1, 2, 3, 4, 5, 6, 7, 8, 9, 10, 11} have relative RE offsets {0,6,3,9,1,7,4,10,2,8,5,11}

Maximum PRS BW is 272 PRBs. Minimum PRS BW is 24 PRBs. The configured PRS BW is always a multiple of 4.

Sounding Reference Signals

For positioning measurement, the UE can be configured (typically by the serving base station) with SRS resource for SRS transmission in $N_S \in \{1,2,4,8,12\}$ number of adjacent symbols anywhere within the slot. The periodic SRS resource can be configured with a periodicity ($T_{SRS}$):

$$T_{SRS} \in$$

$$\{1, 2, 4, 5, 8, 10, 16, 20, 32, 40, 64, 80, 160, 320, 640, 1280, 2560\} \text{ slots}$$

DRX Cycle Operation

The UE can be configured DRX cycle to use in all RRC states (e.g., RRC idle state, RRC inactive state and RRC connected state) to save UE battery power. Examples of lengths of DRX cycles currently used in RRC idle/inactive state are 320 ms, 640 ms, 1.28 s and 2.56 s. Examples of lengths of DRX cycles currently used in RRC connected state may range from 2 ms to 2.56 s. The DRX cycle is configured by the network node and is characterized by the following parameters:

On duration: During the on duration of the DRX cycle, a timer called 'onDurationTimer', which is configured by the network node, is running. This timer specifies the number of consecutive control channel subframes (e.g., PDCCH slots) at the beginning of a DRX Cycle. It is also interchangeably called as DRX ON period. It is the duration (e.g., in number of downlink subframes) during which the UE after waking up from DRX may receive control channel (e.g., PDCCH, wake up signal etc.). If the UE successfully decodes the control channel (e.g., PDCCH) during the on duration then the UE starts a DRX-inactivity timer (see below) and stays awake until its expiry.

DRX-inactivity timer: It specifies the number of consecutive control channel (e.g., PDCCH,) subframe(s) after the subframe in which a control channel (e.g., PDCCH) indicates an initial UL or DL user data transmission for this MAC entity. It is also configured by the network node.

DRX active time: This time is the duration during which the UE monitors the control channel (e.g., PDCCH, wake up signals etc.). In other words, this is the total duration during which the UE is awake. This includes the "on-duration" of the DRX cycle, the time during which the UE is performing continuous reception while the inactivity timer has not expired and the time the UE is performing continuous reception while waiting for a DL retransmission after one HARQ RTT. This means duration over which the DRX-inactivity timer is running is called as DRX active time i.e., no DRX is used by the UE.

DRX inactive time: The time during the DRX cycle other than the active time is called as DRX inactive time i.e., DRX is used by the UE.

The DRX active time and DRX inactive time are also called as DRX ON and DRX OFF durations of the DRX cycle respectively are shown in FIG. 2. The DRX inactive time may also be called as non-DRX or non-DRX period.

DRX configuration herein may also be an enhanced or extended DRX (eDRX) configuration. In legacy DRX related procedures the UE can be configured with DRX cycle length of up to 2.56 seconds. But UEs supporting extended DRX (eDRX) can be configured with a DRX cycle at least longer than 2.56 seconds and typically much longer than 2.56 seconds i.e., in order of several seconds to several minutes. The eDRX configuration parameters include an eDRX cycle length, paging window length aka paging time window (PTW) length etc. Within a PTW of the eDRX, the UE is further configured with one or more legacy DRX cycles.

SUMMARY

According to some embodiments, methods for activating positioning SRS during DRX inactive time are provided. Such methods may be performed by a radio node (e.g., base station), a positioning node (e.g., location management function (LMF), node), and/or a wireless device (e.g., user equipment (UE)).

According to other embodiments, a communication device, computer program, and/or computer program product is provided for performing the above methods.

BRIEF DESCRIPTION OF THE DRAWINGS

The accompanying drawings, which are included to provide a further understanding of the disclosure and are incorporated in and constitute a part of this application, illustrate certain non-limiting embodiments of the present disclosure. In the drawings:

FIGS. 4A and 4B show examples associated with activating positioning SRS during DRX inactive time, according to various aspects of the present disclosure.

FIG. 14 shows an example process associated with activating positioning SRS during DRX inactive time, according to various aspects of the present disclosure.

FIG. 15 shows an example process associated with activating positioning SRS during DRX inactive time, according to various aspects of the present disclosure.

DETAILED DESCRIPTION

Figures 1, 2:
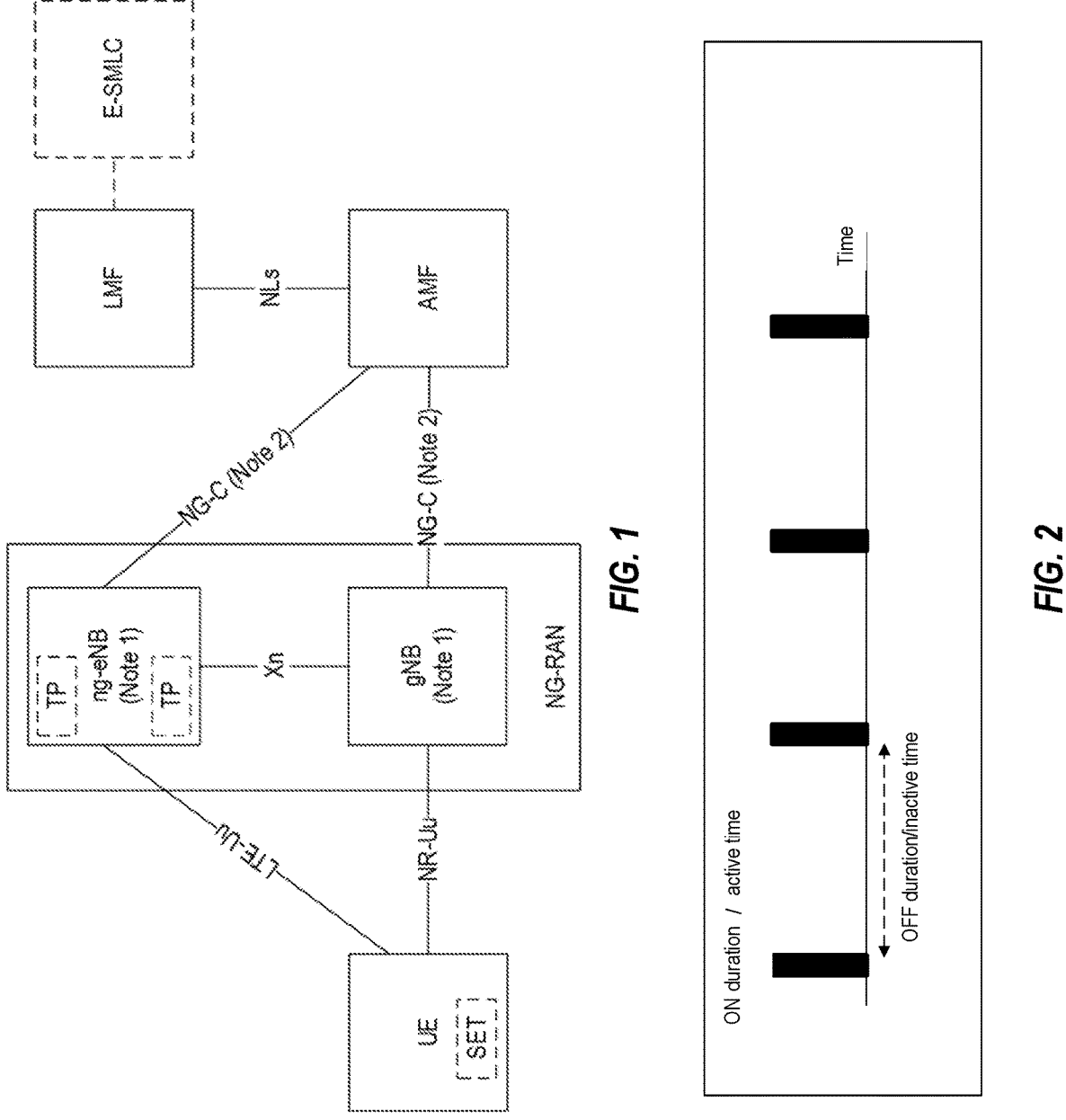
FIG. 1 shows an example associated with activating positioning SRS during DRX inactive time, according to various aspects of the present disclosure.
FIG. 2 shows an example associated with activating positioning SRS during DRX inactive time, according to various aspects of the present disclosure.

The present disclosure will now be described more fully hereinafter with reference to the accompanying drawings, in which examples of embodiments of the present disclosure are shown. The present disclosure may, however, be embodied in many different forms and should not be construed as limited to the embodiments set forth herein. Rather, these embodiments are provided so that this disclosure will be thorough and complete, and will fully convey the scope of present the present disclosure to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Problems

There currently exist certain challenge(s). During inactive time of the DRX cycle the UE is not expected to transmit any signal. This is to enable the UE to save its power since uplink transmission consumes considerable amount of the UE battery power. Also, the UE transmit timing may become inaccurate if the inactive time has been too long. To determine the correct UE transmit timing prior to the transmission, the UE will have to acquire DL timing of the serving cell. This requires transmission during inactive time, which means the UE has to spend even more of its resources including the battery.

The base station receiver is also typically configured not to receive UE signals during the DRX inactive time period. The BS receiver may not receive the UE transmitted signals (e.g., SRS) during the DRX inactive time. Furthermore, if the BS receiver does not know whether or not the UE transmits the configured transmission (currently the UE may drop such transmission during the inactive time, even if configured), then the BS needs to first determine the presence of such signal prior to receiving it, for example, blindly. Blind detection especially for multiple UEs could be challenging and requires a lot of BS resources e.g., store and post processing.

And there can always be legacy UE (e.g., Rel-15 UE) which already are allowed to drop such transmission, so even if the neighbor BS knows the SRS configuration and does not need to blindly search over the entire inactivity period, it still needs to know whether or not a certain UE is required to transmit which may depend on UE capability and/or release. Such knowledge is also currently missing at the BS. Furthermore, the BS may need to have implementation to support both types of UEs.

BRIEF SUMMARY

Certain aspects of the present disclosure and their embodiments may provide solutions to these or other challenges. The scenario comprising a first network node or a primary node (Node1 e.g., BS, LMU) configured to perform a measurement (e.g., positioning measurement) on signals (e.g., SRS) transmitted by a UE, which is configured in DRX.

According to the basic concept of a first embodiment, a second node (Node 2 e.g., BS, positioning node, etc.) determines whether the Node1 can receive the UE transmitted signals during the DRX inactive time and based on the determination, perform one or more operational tasks. Examples of tasks comprise:

if Node1 can receive signals during the DRX inactive time, then configuring the UE to allow the UE to transmit SRS during at least DRX inactive time, and also:

Node 2 may further provide Node 1 with the SRS transmission configuration for inactive periods, and/or Node 2 may further implicitly or explicitly indicate whether the UE will transmit the configured SRS during inactive period when there are some UEs which are not mandated to transmit the configured SRS during inactive periods (e.g., Node2 may indicate UE release or UE capability information or the behavior with which the UE has been configured).

if Node1 cannot receive signals during the DRX inactive time then e.g.

configuring the UE not to transmit SRS during DRX inactive time, configuring the UE with SRS transmission only during DRX active time, or Node2 may not provide to Node1 the part of SRS transmissions configuration which are comprised in inactive periods According to the basic concept of a second embodiment, Node1 informs Node2 whether it can receive the SRS transmitted by the UE during DRX inactive time. Node1 upon determining that the UE may transmit SRS during the DRX inactive time adapting its receiver to receive SRS signals and use them for one or more operations e.g., for doing positioning measurements.

According to the basic concept of a third embodiment, the UE may transmit SRS at least during the DRX inactive time only if the UE is explicitly allowed to do so by Node2, e.g., based on an indication received from Node2. Otherwise the UE transmits SRS only during the DRX active time.

In one example, Node1 and Node2 are the same node, e.g., serving base station receiving SRS for positioning measurements and configuring the UE whether the UE is allowed or not allowed to transmit SRS during the DRX inactive time.

In another example, Node1 and Node2 are different nodes. For example, Node1 receives SRS from the UE for doing positioning measurement while Node2 configures the UE whether the UE is allowed or not allowed to transmit SRS during the DRX inactive time. In general, Node1 and Node2 are radio node and configuring node respectively. Examples of radio nodes are BS, LMU, etc. Examples of configuring nodes are BS, positioning node etc. In one specific example Node1 and Node2 are neighboring base station and serving base station of the UE respectively. In another example Node1 and Node2 are LMU and serving base station of the UE respectively. In another example, Node1 and Node2 are LMU and positioning node respectively. In another example, Node1 and Node2 are base station and positioning node respectively.

There are, proposed herein, various embodiments which address one or more of the issues disclosed herein.

Advantages

Certain embodiments may provide one or more of the following technical advantage(s):

The method ensures that the BS positioning measurement performance is not degraded when UE is in the DRX inactive time.

The method enables the measuring radio node (e.g., UE, gNB, LMU, etc.) to control UE SRS transmission behavior in in the DRX inactive time. This in turn allow the BS to optimize its resources for receiving and processing signals from multiple UEs during overlapping time periods.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Terminology

In this invention disclosure a term node is used which can be a network node or a user equipment (UE).

Examples of network nodes are NodeB, base station (BS), multi-standard radio (MSR) radio node such as MSR BS, eNodeB, gNodeB. MeNB, SeNB, location measurement unit (LMU), integrated access backhaul (IAB) node, network controller, radio network controller (RNC), base station controller (BSC), relay, donor node controlling relay, base transceiver station (BTS), Central Unit (e.g., in a gNB), Distributed Unit (e.g., in a gNB), Baseband Unit, Centralized Baseband, C-RAN, access point (AP), transmission points, transmission nodes, transmission reception point (TRP), RRU, RRH, nodes in distributed antenna system (DAS), core network node (e.g., MSC, MME etc.), O&M, OSS, SON, positioning node (e.g., E-SMLC), etc.

The non-limiting term UE refers to any type of wireless device communicating with a network node and/or with another UE in a cellular or mobile communication system. Examples of UE are target device, device to device (D2D) UE, vehicular to vehicular (V2V), machine type UE, MTC UE or UE capable of machine to machine (M2M) communication, PDA, tablet, mobile terminals, smart phone, laptop embedded equipment (LEE), laptop mounted equipment (LME), USB dongles etc.

The term radio access technology, or RAT, may refer to any RAT, e.g., UTRA, E-UTRA, narrow band internet of things (NB-IoT), WiFi, Bluetooth, next generation RAT, New Radio (NR), 4G, 5G, etc. Any of the equipment denoted by the term node, network node or radio network node may be capable of supporting a single or multiple RATs.

The term signal or radio signal used herein can be any physical signal or physical channel. Examples of DL physical signals are reference signal such as PSS, SSS, CSI-RS, DMRS, signals in SSB, DRS, CRS, PRS etc. Examples of UL physical signals are reference signal such as SRS, DMRS etc. The term physical channel refers to any channel carrying higher layer information e.g., data, control etc. Examples of physical channels are PBCH, NPBCH, PDCCH, PDSCH, sPUCCH, sPDSCH. sPUCCH. sPUSCH, MPDCCH, NPDCCH, NPDSCH, E-PDCCH, PUSCH, PUCCH, NPUSCH, etc.

EMBODIMENTS

Scenario

The scenario comprises at least a UE, a first node (Node1) and a second node (Node2). Node1 and Node2 are radio node and configuring node respectively. Node1 is therefore capable of at least operating (e.g., transmit and/or receive)

radio signals (e.g., SRS, PRS etc.). Node2 can configure Node 1 and the UE with a higher layer signaling/message. Node 1 may or may not be capable of configure the UE with a higher layer signaling/message. Node2 may or may not be capable of operating (e.g., transmit and/or receive) radio signals (e.g., SRS, PRS etc.).

The UE is configured with DRX cycle and is further configured to transmit at least SRS, which can be received and used by Node1 for performing positioning measurements e.g., gNB Rx-Tx, SRS-RSRP etc. The UE may further be configured to operate (e.g., transmit and/or receive) other types of signals e.g., for receiving PRS signals from Node1. Similarly, Node1 may further be configured to operate (e.g., transmit and/or receive) other types of signals e.g., for transmitting PRS signals. The positioning measurement performed by Node1 uses at least SRS transmitted by the UE. However, it may also use additional signals such as PRS for the positioning measurement. The UE may be configured with parameters such as SRS, DRX or with other type of reference signals by Node1 or Node2 or by a third node (Node3).

Figures 3, 4:
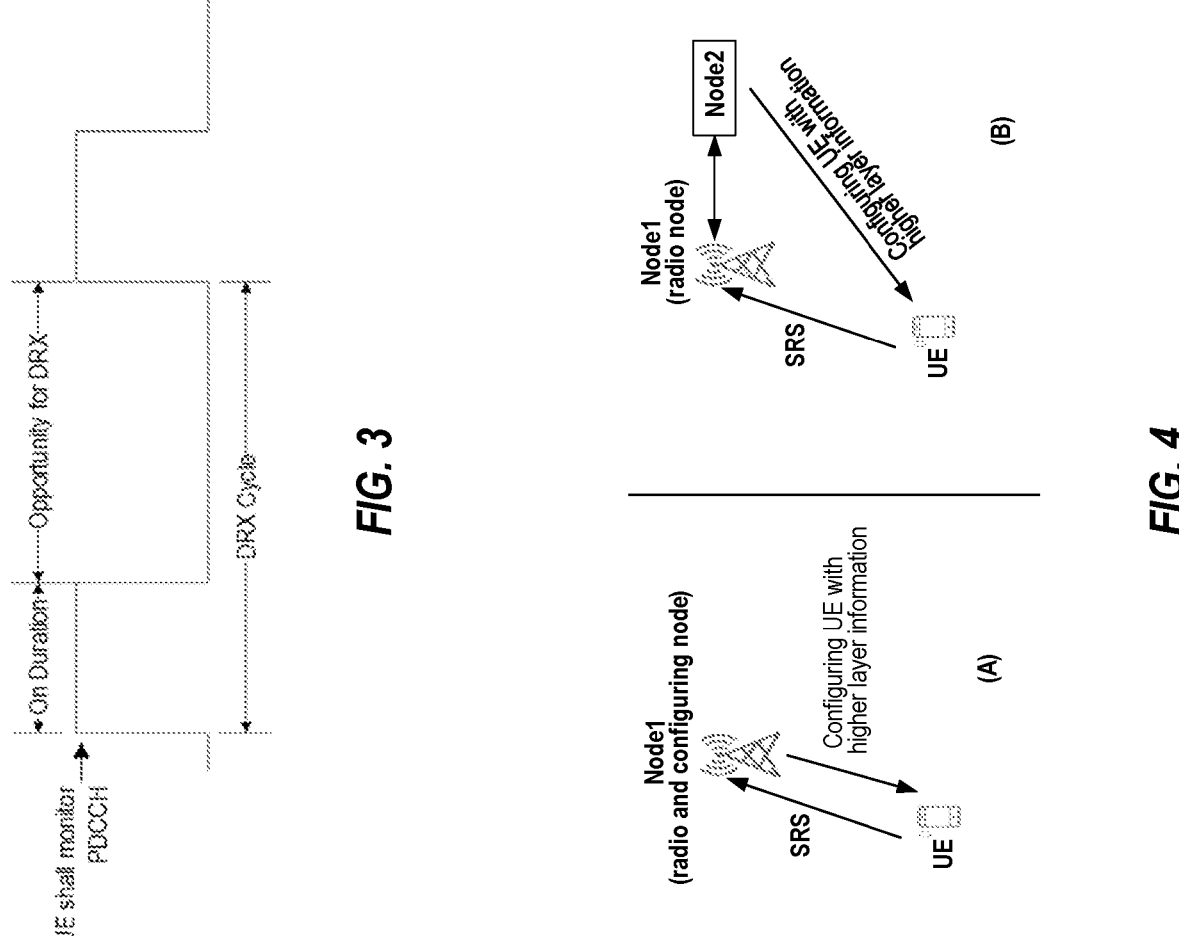
FIG. 3 shows an example associated with activating positioning SRS during DRX inactive time, according to various aspects of the present disclosure.

Node1 and Node2 can be of different characteristics based on network configuration and type of positioning measurement performed by Node1. There are at least 2 exemplary scenarios:

In a first exemplary scenario, Node1 and Node2 are the same e.g., Node1 and Node2 functionalities lie in the same node. For example, Node1 is capable of both operating radio signals and configuring the UE with higher layer signaling/message. This example is shown in FIG. 4 (A).

In a second exemplary scenario, Node1 and Node2 are different nodes. For example, Node1 is capable of at least operating radio signals while Node2 configures the UE with higher layer signaling/message. Node 1 may or may not be capable of configuring the UE with higher layer signaling. This example is shown in FIG. 4 (B).

For simplicity the Fig. shows only SRS transmission by the UE. However, the UE may transmit and/or receive other signals e.g., PRS from Node 1

All the embodiments are applicable for both scenarios.

Embodiment #1: Method in Node2 of Configuring UE's SRS Operation in DRX Based on Node1 Status According to this embodiment Node2 determines whether Node1 can receive the UE's SRS transmission in the UE's DRX inactive time and based on the determination Node2 performs one or more operational tasks. These steps in Node2 are elaborated below with several examples.

For simplicity a term, 'SRS reception status in DRX inactive time', is used herein and it refers to 'whether Node1 can receive the SRS transmitted by the UE in the UE's DRX inactive time or not'. Node2 obtains the information about Node1's SRS reception status in DRX inactive time based on pre-defined information (e.g., stored in Node2) or based on an indication or message received from Node1 or based on an indication or message received from another node which is aware of the SRS reception status of Node1. In the latter approach (signaling based), Node 1 may inform its SRS reception status to Node2 proactively or upon receiving a request from Node2. The SRS reception status can be static or semi-static/dynamic as elaborated with examples below:

Static Node 1 capability: In one example SRS reception status in DRX inactive time may correspond to the Node1 capability, which is pre-configured in Node 1. In this case Node1 is either capable of receiving SRS in the UE's DRX inactive time (e.g., status=1 or ON or active etc.) or is not capable of receiving SRS in the UE's DRX inactive time (e.g., status=0 or OFF or inactivated etc.). For example status ON may mean that the Node1 can be capable of receiving any SRS during UE inactive periods even when a complete SRS configuration is not available at Node1 or the UE may transmit not all SRS transmissions configured during inactive period regardless of any condition.

Dynamic/semi-static Node 1 capability: In another example SRS reception status in DRX inactive time may correspond to the Node1 capability, which may vary over time or may depend on one or more conditions e.g., resources. This is elaborated with several examples below:

In this case in one example the SRS reception status in DRX inactive time of Node1 may change over time based on an amount of resources available in Node1, traffic load (e.g., number of UEs whose SRS are to be received by Node1 during at least partially overlapping time, number of UEs whose SRS in DRX active time are to be received by Node 1 during at least partially overlapping time) etc. Examples of resources are processors units, memory units etc. For example if the availability of resources (e.g., memory size) in Node1 is below certain threshold (e.g., available memory is less than 20% of maximum memory in Node1 and/or available processors' capacity is less than 20% of maximum processor capacity in Node1 etc.) then Node1 may declare that it cannot receive SRS during the DRX inactive time i.e. SRS reception status in DRX inactive time is OFF or 0 or inactivated etc. Otherwise (i.e. if the availability of resources (e.g., memory size) in Node1 is equal to or above certain threshold then Node1 may declare that it can receive SRS during the DRX inactive time i.e. SRS reception status in DRX inactive time is ON or 1 or activate etc.

In another example the SRS status may change depending on number (Nu) of UEs whose SRS are to be received or being received by Node 1 within certain time period. For example, assume that Node1 can receive only H1 number of UEs' SRS in DRX inactive time within certain time period. When Nu becomes equal to H1 then Node1 may declare that it cannot receive SRS in DRX inactive time from any additional UE; otherwise (i.e. if Nu<H1) Node1 may declare that it can receive SRS in DRX inactive time from one or more additional UEs. Node1 may further declare the duration (D) over which the SRS reception status is valid starting from certain reference time (Tr). For example, Node 1 may indicate that its SRS reception status is ON over duration, D1 and is OFF over duration, D2. As special case D1=D2. Examples of reference time (Tr) is frame number (e.g., system frame number (SFN)), hyper SFN, GNSS time, UTC time etc.

In another example, Node 1 can be capable of receiving any SRS during UE inactive periods even when a complete SRS configuration is not available at Node1 or the UE may transmit not all SRS transmissions configured during inactive period provided that the signal strength or quality of SRS at Node 1 is not below a threshold Th1 (can be the same or different from Th2 and Th3).

In another example, Node1 can be capable of receiving SRS transmissions during UE inactive periods, only provided all SRS transmission occasions during inactive period are known to Node1 and the UE will transmit In another example, Node1 can be capable of receiving SRS transmissions during UE inactive periods, only provided all SRS transmission occasions during inactive period are known to Node1 and the UE will transmit, and the signal strength or quality of SRS is not below a threshold Th2 (can be the same or different from Th1 and Th3)

In yet another example, Node1 can be capable of receiving SRS transmissions during UE inactive periods, only provided all N (e.g., N=1, 2, . . . ; N can be ≤Nmax) SRS transmissions occasions during inactive period are known to Node1 but the UE may or may not transmit in them.

In yet another example, Node1 can be capable of receiving SRS transmissions during UE inactive periods, only provided all N (e.g., N=1, 2, . . . ; N can be ≤Nmax) SRS transmissions occasions during inactive period are known to Node1 but the UE may or may not transmit in them and provided that the signal strength or quality of SRS is not below a threshold Th3 (can be the same or different from Th1 and Th2).

An example of the determined Node1's SRS reception status in DRX inactive time is shown in table 1. Another example of the determined Node1's SRS reception status in DRX inactive time along with validity time is shown in table 2.

TABLE 1

Example of SRS reception status of Node1

| SRS reception status | Meaning |
|---|---|
| ON | Node1 can receive SRS during DRX inactive time |
| OFF | Node1 cannot receive SRS during DRX inactive time |

TABLE 2

Example of SRS reception status of Node1 along with validity time

| SRS reception status | Status validity duration (D) | Meaning |
|---|---|---|
| ON | D1 | Node1 can receive SRS during DRX inactive time over D1 starting from reference time, Tr |

After determining information about Node1's SRS reception status in DRX inactive time, Node2 uses this determined information/status for performing one or more operational tasks. Examples of task comprising:

if it is determined that Node1 SRS reception status in DRX inactive time is ON (i.e. Node1 can receive signals during the DRX inactive time) then Node2 configures the UE for allowing the UE to transmit SRS during at least DRX inactive time. For example, Node2 may send an indicator, SRS transmission in DRX inactive=1 (allowed).

if it is determined that Node1 SRS reception status in DRX inactive time is OFF (i.e. Node1 cannot receive signals during the DRX inactive time) then Node2 configures the UE to forbid the UE from transmitting SRS during at least DRX inactive time. For example, Node2 may send an indicator, SRS transmission in DRX inactive=0 (not allowed).

if it is determined that Node1 SRS reception status in DRX inactive time is OFF then Node2 may configure the UE with SRS transmission only during DRX active time e.g., semi-persistent SRS transmission is configured only during DRX active time.

if it is determined that Node1 SRS reception status in DRX inactive time is ON then Node2 may also configure the UE with SRS transmission during DRX inactive time e.g., semi-persistent SRS transmission is configured during DRX inactive time and may also be during DRX active time.

Embodiment #2: Method in Node 1 of Determining and Informing its SRS Reception Status to Other Nodes According to this embodiment Node1 determines its SRS reception status in DRX inactive time and uses this information for one or more operational tasks. These steps in Node1 are elaborated below with several examples.

As described in embodiment #1 that Node1's SRS reception status in DRX inactive time can be static capability or it may change over time semi-statically or dynamically (e.g., due to available resources in Node1, traffic load, etc.). Node1 determines its SRS reception status (static or semi-static/dynamic) as described in section embodiment #1.

Node1 may further determine whether the UE will transmit the SRS during the DRX inactive time or not. Node1 may determine this based on for example information received from another node e.g., Node2, UE, positioning node, by retrieving information internally etc. Node1 may further determine the details about the SRS configuration used by the UE for sending the SRS e.g., time-frequency resources, bandwidth, SRS transmission period etc. containing the SRS.

Examples of Node1's operational tasks which may use the information about the SRS reception status in DRX inactive time comprising:

Transmitting information about Node1's SRS reception status in DRX inactive time to other nodes e.g., to Node2, UE etc. Node1 may transmit this information to other nodes proactively or based on request received from the other node. In another example Node1 may transmit this information to other nodes when the SRS reception status in DRX inactive time changes e.g., from ON to OFF or vice versa.

If it is determined that Node1's SRS reception status in DRX inactive time is ON and the UE is going to transmit SRS at least during DRX inactive time then Node1 may adapt its receiver for receiving the UE's SRS transmission. For example, Node1 may tune its receiver parameters which match with the SRS configuration of the UE during the DRX inactive time.

In another example Node1 may only transmit information about its SRS reception status to other nodes only if its SRS reception status is ON (i.e., it can receive the SRS during DRX inactive time); otherwise (i.e., by default) other nodes (e.g., UE, Node2, etc.) may assume that the SRS reception status of Node1 is OFF (i.e., by default it cannot receive the SRS during DRX inactive time).

Embodiment #3: Method in UE of Determining and Using Node1's SRS Reception Status for Operations According to this embodiment UE determines information about Node1's SRS reception status in DRX inactive time and uses this determined information for one or more operational tasks. The received SRS status information enables the UE to determine whether or not the UE is allowed to transmit SRS during its DRX inactive time as shown in table 3. These steps in UE are elaborated below with several examples.

The UE determines the SRS reception status of Node1 by receiving information from Node2 or Node1 as described in embodiments #1 and #2. The information may be received via lower layers (e.g., PDCCH, MAC etc.) or via higher layer (e.g., RRC, LPP etc.).

Examples of operational tasks, which uses the received information comprising:

Adapting SRS transmission during the DRX. For example, if the Node1's SRS reception status is OFF then the UE does not transmit SRS during the DRX inactive time. But if the Node1's SRS reception status is ON then the UE may transmit SRS during the DRX inactive time.

Informing other nodes (e.g., positioning node, base station, etc.) whether it can adapt the SRS transmission (as described above) based on the Node1's SRS reception status in DRX inactive time. This information may be used by the other node for adapting one or more of: SRS configuration of the UE, positioning measurement configuration parameters in the assistance data, DRX configuration of the UE etc.

Informing other nodes (e.g., positioning node, base station etc.) that it has adapted the SRS transmission based on Node1's SRS reception status in DRX inactive time. It may further transmit information about the adaptation of the SRS.

Informing other nodes (e.g., positioning node etc.) that it is aware of the Node1's SRS reception status in DRX inactive time.

TABLE 3

Example of impact of Node1's SRS reception status on UE behavior

| SRS reception status | UE action/behavior |
|---|---|
| ON | UE may transmit SRS during DRX inactive time |
| OFF | UE is not allowed to transmit SRS during DRX inactive time; UE is only allowed to transmit SRS during DRX active time. |

Figure 5:
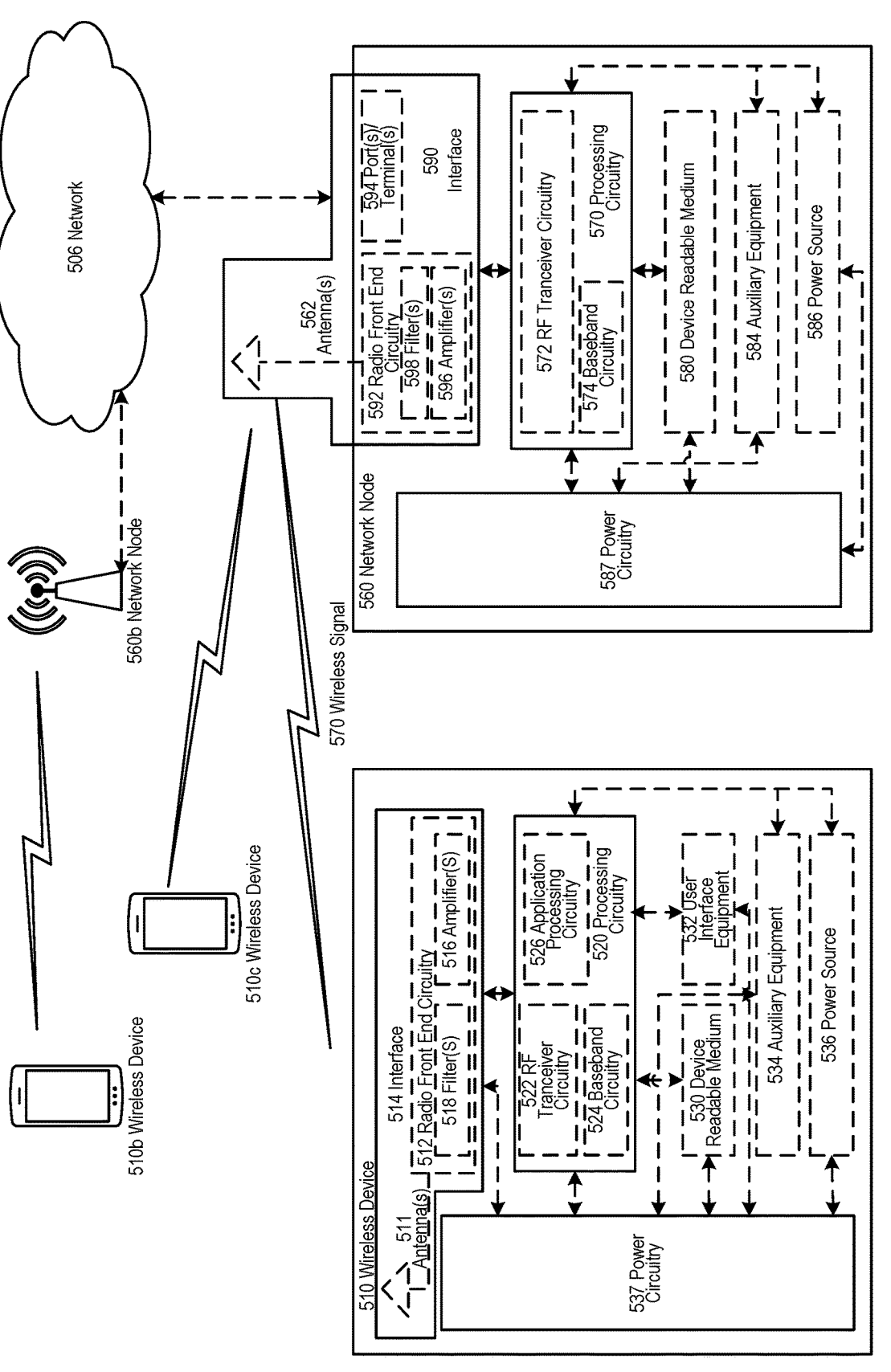
FIG. 5 shows an example wireless network associated with activating positioning SRS during DRX inactive time, according to various aspects of the present disclosure.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 506, network nodes 560 and 560b, and WDs 510, 510b, and 510c. In practice, a wireless network may further include any additional elements suitable to support communication between wireless devices or between a wireless device and another communication device, such as a landline telephone, a service provider, or any other network node or end device. Of the illustrated components, network node 560 and wireless device (WD) 510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 560 and WD 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 560 includes processing circuitry 570, device readable medium 580, interface 590, auxiliary equipment 584, power source 586, power circuitry 587, and antenna 562. Although network node 560 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple RAM modules).

Similarly, network node 560 may be composed of multiple physically separate components (e.g., a NodeB component and a RNC component, or a BTS component and a BSC component, etc.), which may each have their own respective components. In certain scenarios in which network node 560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 560 may be configured to support multiple radio access technologies (RATs). In such embodiments, some components may be duplicated (e.g., separate device readable medium 580 for the different RATs) and some components may be reused (e.g., the same antenna 562 may be shared by the RATs). Network node 560 may also include multiple sets of the various illustrated components for different wireless technologies integrated into network node 560, such as, for example, GSM, WCDMA, LTE, NR, WiFi, or Bluetooth wireless technologies. These wireless technologies may be integrated into the same or different chip or set of chips and other components within network node 560.

Processing circuitry 570 is configured to perform any determining, calculating, or similar operations (e.g., certain obtaining operations) described herein as being provided by a network node. These operations performed by processing circuitry 570 may include processing information obtained by processing circuitry 570 by, for example, converting the obtained information into other information, comparing the obtained information or converted information to information stored in the network node, and/or performing one or more operations based on the obtained information or converted information, and as a result of said processing making a determination.

Processing circuitry 570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 560 components, such as device readable medium 580, network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a system on a chip (SOC).

In some embodiments, processing circuitry 570 may include one or more of radio frequency (RF) transceiver circuitry 572 and baseband processing circuitry 574. In some embodiments, radio frequency (RF) transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units In certain embodiments, some or all of the functionality described herein as being provided by a network node, base station, eNB or other such network device may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner. In any of those embodiments, whether executing instructions stored on a device readable storage medium or not, processing circuitry 570 can be configured to perform the described functionality. The benefits provided by such functionality are not limited to processing circuitry 570 alone or to other components of network node 560, but are enjoyed by network node 560 as a whole, and/or by end users and the wireless network generally.

Device readable medium 580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signalling and/or data between network node 560, network 506, and/or WDs 510. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and amplifiers 596. Radio front end circuitry 592 may be connected to antenna 562 and processing circuitry 570. Radio front end circuitry may be configured to condition signals communicated between antenna 562 and processing circuitry 570. Radio front end circuitry 592 may receive digital data that is to be sent out to other network nodes or WDs via a wireless connection. Radio front end circuitry 592 may convert the digital data into a radio signal having the appropriate channel and bandwidth parameters using a combination of filters 598 and/or amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components.

In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals. Antenna 562 may be coupled to radio front end circuitry 590 and may be any type of antenna capable of transmitting and receiving data and/or signals wirelessly. In some embodiments, antenna 562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 562 may be separate from network node 560 and may be connectable to network node 560 through an interface or port.

Antenna 562, interface 590, and/or processing circuitry 570 may be configured to perform any receiving operations and/or certain obtaining operations described herein as being performed by a network node. Any information, data and/or signals may be received from a wireless device, another network node and/or any other network equipment. Similarly, antenna 562, interface 590, and/or processing circuitry 570 may be configured to perform any transmitting operations described herein as being performed by a network node. Any information, data and/or signals may be transmitted to a wireless device, another network node and/or any other network equipment.

Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587.

The battery may provide backup power should the external power source fail. Other types of power sources, such as photovoltaic devices, may also be used.

Alternative embodiments of network node 560 may include additional components beyond those shown in FIG. 5 that may be responsible for providing certain aspects of the network node's functionality, including any of the functionality described herein and/or any functionality necessary to support the subject matter described herein. For example, network node 560 may include user interface equipment to allow input of information into network node 560 and to allow output of information from network node 560. This may allow a user to perform diagnostic, maintenance, repair, and other administrative functions for network node 560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 510 includes antenna 511, interface 514, processing circuitry 520, device readable medium 530, user interface equipment 532, auxiliary equipment 534, power source 536 and power circuitry 537. WD 510 may include multiple sets of one or more of the illustrated components for different wireless technologies supported by WD 510, such as, for example, GSM, WCDMA, LTE, NR, WiFi, WiMAX, or Bluetooth wireless technologies, just to mention a few. These wireless technologies may be integrated into the same or different chips or set of chips as other components within WD 510.

Antenna 511 may include one or more antennas or antenna arrays, configured to send and/or receive wireless signals, and is connected to interface 514. In certain alternative embodiments, antenna 511 may be separate from WD 510 and be connectable to WD 510 through an interface or port. Antenna 511, interface 514, and/or processing circuitry 520 may be configured to perform any receiving or transmitting operations described herein as being performed by a WD. Any information, data and/or signals may be received from a network node and/or another WD. In some embodiments, radio front end circuitry and/or antenna 511 may be considered an interface.

As illustrated, interface 514 comprises radio front end circuitry 512 and antenna 511. Radio front end circuitry 512 comprise one or more filters 518 and amplifiers 516. Radio front end circuitry 514 is connected to antenna 511 and processing circuitry 520, and is configured to condition signals communicated between antenna 511 and processing circuitry 520. Radio front end circuitry 512 may be coupled to or a part of antenna 511. In some embodiments, WD 510 may not include separate radio front end circuitry 512; rather, processing circuitry 520 may comprise radio front end circuitry and may be connected to antenna 511. Similarly, in some embodiments, some or all of RF transceiver circuitry 522 may be considered a part of interface 514. Radio front end circuitry 512 may receive digital data that is to be sent out to other network nodes or WDs via a wireless connection. Radio front end circuitry 512 may convert the digital data into a radio signal having the appropriate channel and bandwidth parameters using a combination of filters 518 and/or amplifiers 516. The radio signal may then be transmitted via antenna 511. Similarly, when receiving data, antenna 511 may collect radio signals which are then converted into digital data by radio front end circuitry 512. The digital data may be passed to processing circuitry 520. In other embodiments, the interface may comprise different components and/or different combinations of components.

Processing circuitry 520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 510 components, such as device readable medium 530, WD 510 functionality. Such functionality may include providing any of the various wireless features or benefits discussed herein. For example, processing circuitry 520 may execute instructions stored in device readable medium 530 or in memory within processing circuitry 520 to provide the functionality disclosed herein.

As illustrated, processing circuitry 520 includes one or more of RF transceiver circuitry 522, baseband processing circuitry 524, and application processing circuitry 526. In other embodiments, the processing circuitry may comprise different components and/or different combinations of components. In certain embodiments processing circuitry 520 of WD 510 may comprise a SOC. In some embodiments, RF transceiver circuitry 522, baseband processing circuitry 524, and application processing circuitry 526 may be on separate chips or sets of chips. In alternative embodiments, part or all of baseband processing circuitry 524 and application processing circuitry 526 may be combined into one chip or set of chips, and RF transceiver circuitry 522 may be on a separate chip or set of chips. In still alternative embodiments, part or all of RF transceiver circuitry 522 and baseband processing circuitry 524 may be on the same chip or set of chips, and application processing circuitry 526 may be on a separate chip or set of chips. In yet other alternative embodiments, part or all of RF transceiver circuitry 522, baseband processing circuitry 524, and application processing circuitry 526 may be combined in the same chip or set of chips. In some embodiments, RF transceiver circuitry 522 may be a part of interface 514. RF transceiver circuitry 522 may condition RF signals for processing circuitry 520.

In certain embodiments, some or all of the functionality described herein as being performed by a WD may be provided by processing circuitry 520 executing instructions stored on device readable medium 530, which in certain embodiments may be a computer-readable storage medium. In alternative embodiments, some or all of the functionality may be provided by processing circuitry 520 without executing instructions stored on a separate or discrete device readable storage medium, such as in a hard-wired manner. In any of those particular embodiments, whether executing instructions stored on a device readable storage medium or not, processing circuitry 520 can be configured to perform the described functionality. The benefits provided by such functionality are not limited to processing circuitry 520 alone or to other components of WD 510, but are enjoyed by WD 510 as a whole, and/or by end users and the wireless network generally.

Processing circuitry 520 may be configured to perform any determining, calculating, or similar operations (e.g., certain obtaining operations) described herein as being performed by a WD. These operations, as performed by processing circuitry 520, may include processing information obtained by processing circuitry 520 by, for example, converting the obtained information into other information, comparing the obtained information or converted information to information stored by WD 510, and/or performing one or more operations based on the obtained information or converted information, and as a result of said processing making a determination.

Device readable medium 530 may be operable to store a computer program, software, an application including one or more of logic, rules, code, tables, etc. and/or other instructions capable of being executed by processing circuitry 520. Device readable medium 530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 520. In some embodiments, processing circuitry 520 and device readable medium 530 may be considered to be integrated.

User interface equipment 532 may provide components that allow for a human user to interact with WD 510. Such interaction may be of many forms, such as visual, audial, tactile, etc. User interface equipment 532 may be operable to produce output to the user and to allow the user to provide input to WD 510. The type of interaction may vary depending on the type of user interface equipment 532 installed in WD 510. For example, if WD 510 is a smart phone, the interaction may be via a touch screen; if WD 510 is a smart meter, the interaction may be through a screen that provides usage (e.g., the number of gallons used) or a speaker that provides an audible alert (e.g., if smoke is detected). User interface equipment 532 may include input interfaces, devices and circuits, and output interfaces, devices and circuits. User interface equipment 532 is configured to allow input of information into WD 510, and is connected to processing circuitry 520 to allow processing circuitry 520 to process the input information. User interface equipment 532 may include, for example, a microphone, a proximity or other sensor, keys/buttons, a touch display, one or more cameras, a USB port, or other input circuitry. User interface equipment 532 is also configured to allow output of information from WD 510, and to allow processing circuitry 520 to output information from WD 510. User interface equipment 532 may include, for example, a speaker, a display, vibrating circuitry, a USB port, a headphone interface, or other output circuitry. Using one or more input and output interfaces, devices, and circuits, of user interface equipment 532, WD 510 may communicate with end users and/or the wireless network, and allow them to benefit from the functionality described herein.

Auxiliary equipment 534 is operable to provide more specific functionality which may not be generally performed by WDs. This may comprise specialized sensors for doing measurements for various purposes, interfaces for additional types of communication such as wired communications etc. The inclusion and type of components of auxiliary equipment 534 may vary depending on the embodiment and/or scenario.

Power source 536 may, in some embodiments, be in the form of a battery or battery pack. Other types of power sources, such as an external power source (e.g., an electricity outlet), photovoltaic devices or power cells, may also be used. WD 510 may further comprise power circuitry 537 for delivering power from power source 536 to the various parts of WD 510 which need power from power source 536 to carry out any functionality described or indicated herein. Power circuitry 537 may in certain embodiments comprise power management circuitry. Power circuitry 537 may additionally or alternatively be operable to receive power from an external power source; in which case WD 510 may be connectable to the external power source (such as an electricity outlet) via input circuitry or an interface such as an electrical power cable. Power circuitry 537 may also in certain embodiments be operable to deliver power from an external power source to power source 536. This may be, for example, for the charging of power source 536. Power circuitry 537 may perform any formatting, converting, or other modification to the power from power source 536 to make the power suitable for the respective components of WD 510 to which power is supplied.

Figure 6:
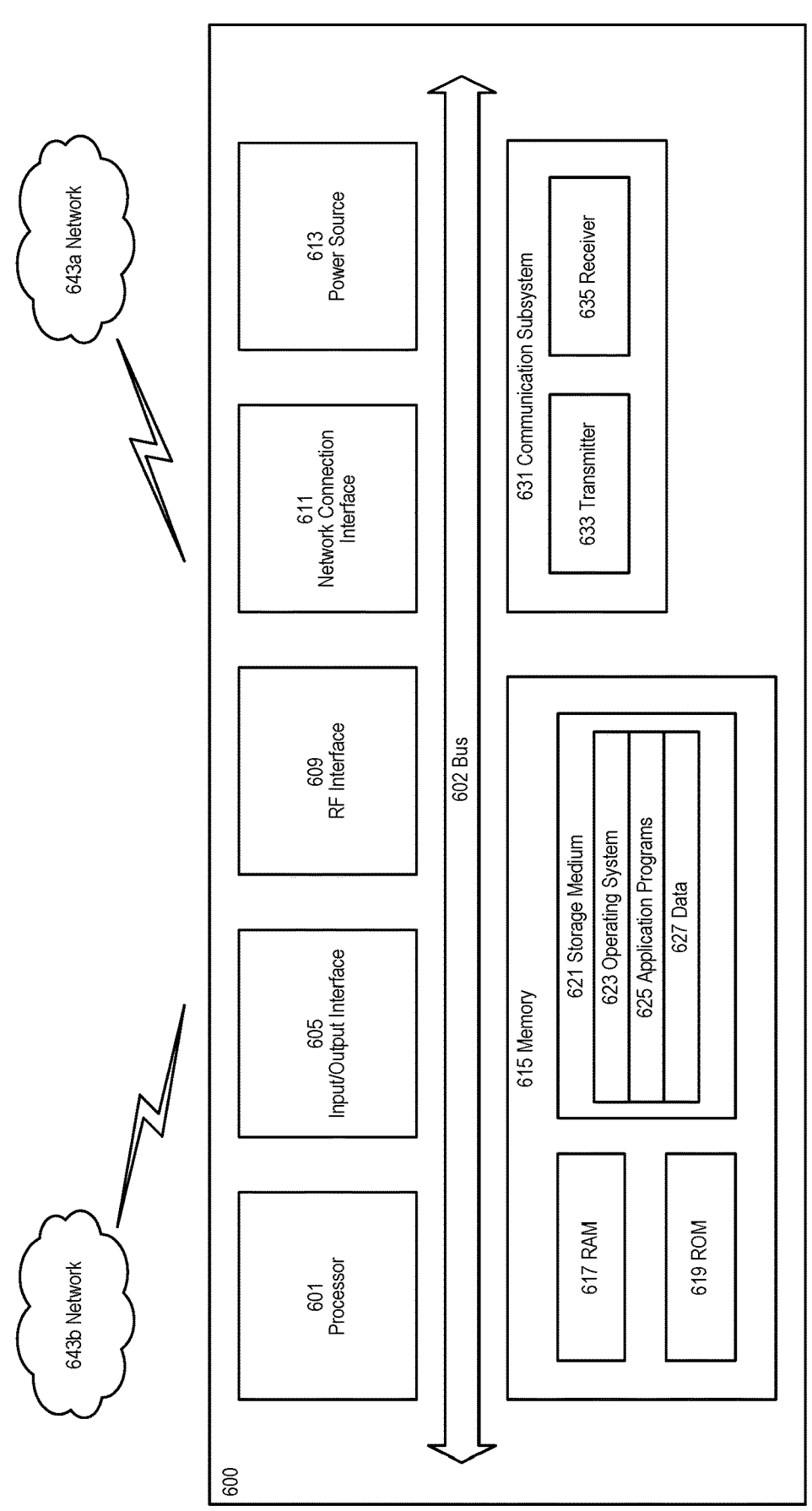
FIG. 6 shows an example wireless device associated with activating positioning SRS during DRX inactive time, according to various aspects of the present disclosure.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 6200 may be any UE identified by the 3rd Generation Partnership Project (3GPP), including a NB-IoT UE, a machine type communication (MTC) UE, and/or an enhanced MTC (eMTC) UE. UE 600, as illustrated in FIG. 6, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 6 is a UE, the components discussed herein are equally applicable to a WD, and vice-versa.

In FIG. 6, UE 600 includes processing circuitry 601 that is operatively coupled to input/output interface 605, radio frequency (RF) interface 609, network connection interface 611, memory 615 including random access memory (RAM) 617, read-only memory (ROM) 619, and storage medium 621 or the like, communication subsystem 631, power source 633, and/or any other component, or any combination thereof. Storage medium 621 includes operating system 623, application program 625, and data 627. In other embodiments, storage medium 621 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 601 may be configured to process computer instructions and data. Processing circuitry 601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 601 may include two central processing units (CPUs). Data may be information in a form suitable for use by a computer.

In the depicted embodiment, input/output interface 605 may be configured to provide a communication interface to an input device, output device, or input and output device. UE 600 may be configured to use an output device via input/output interface 605. An output device may use the same type of interface port as an input device. For example, a USB port may be used to provide input to and output from UE 600. The output device may be a speaker, a sound card, a video card, a display, a monitor, a printer, an actuator, an emitter, a smartcard, another output device, or any combination thereof. UE 600 may be configured to use an input device via input/output interface 605 to allow a user to capture information into UE 600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 609 may be configured to provide a communication interface to RF components such as a transmitter, a receiver, and an antenna. Network connection interface 611 may be configured to provide a communication interface to network 643a. Network 643a may encompass wired and/or wireless networks such as a local-area network (LAN), a wide-area network (WAN), a computer network, a wireless network, a telecommunications network, another like network or any combination thereof. For example, network 643a may comprise a Wi-Fi network. Network connection interface 611 may be configured to include a receiver and a transmitter interface used to communicate with one or more other devices over a communication network according to one or more communication protocols, such as Ethernet, TCP/IP, SONET, ATM, or the like. Network connection interface 611 may implement receiver and transmitter functionality appropriate to the communication network links (e.g., optical, electrical, and the like). The transmitter and receiver functions may share circuit components, software or firmware, or alternatively may be implemented separately.

RAM 617 may be configured to interface via bus 602 to processing circuitry 601 to provide storage or caching of data or computer instructions during the execution of software programs such as the operating system, application programs, and device drivers. ROM 619 may be configured to provide computer instructions or data to processing circuitry 601. For example, ROM 619 may be configured to store invariant low-level system code or data for basic system functions such as basic input and output (I/O), startup, or reception of keystrokes from a keyboard that are stored in a non-volatile memory. Storage medium 621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 621 may be configured to include operating system 623, application program 625 such as a web browser application, a widget or gadget engine or another application, and data file 627. Storage medium 621 may store, for use by UE 600, any of a variety of various operating systems or combinations of operating systems.

Storage medium 621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 621 may allow UE 600 to access computer-executable instructions, application programs or the like, stored on transitory or non-transitory memory media, to off-load data, or to upload data. An article of manufacture, such as one utilizing a communication system may be tangibly embodied in storage medium 621, which may comprise a device readable medium.

In FIG. 6, processing circuitry 601 may be configured to communicate with network 643b using communication subsystem 631. Network 643a and network 643b may be the same network or networks or different network or networks.

Communication subsystem 631 may be configured to include one or more transceivers used to communicate with network 643*b*. For example, communication subsystem 631 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 633 and/or receiver 635 to implement transmitter or receiver functionality, respectively, appropriate to the RAN links (e.g., frequency allocations and the like). Further, transmitter 633 and receiver 635 of each transceiver may share circuit components, software or firmware, or alternatively may be implemented separately.

In the illustrated embodiment, the communication functions of communication subsystem 631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 631 may include cellular communication, Wi-Fi communication, Bluetooth communication, and GPS communication. Network 643*b* may encompass wired and/or wireless networks such as a local-area network (LAN), a wide-area network (WAN), a computer network, a wireless network, a telecommunications network, another like network or any combination thereof. For example, network 643*b* may be a cellular network, a Wi-Fi network, and/or a near-field network. Power source 613 may be configured to provide alternating current (AC) or direct current (DC) power to components of UE 600.

The features, benefits and/or functions described herein may be implemented in one of the components of UE 600 or partitioned across multiple components of UE 600. Further, the features, benefits, and/or functions described herein may be implemented in any combination of hardware, software or firmware. In one example, communication subsystem 631 may be configured to include any of the components described herein. Further, processing circuitry 601 may be configured to communicate with any of such components over bus 602. In another example, any of such components may be represented by program instructions stored in memory that when executed by processing circuitry 601 perform the corresponding functions described herein. In another example, the functionality of any of such components may be partitioned between processing circuitry 601 and communication subsystem 631. In another example, the non-computationally intensive functions of any of such components may be implemented in software or firmware and the computationally intensive functions may be implemented in hardware.

Figure 7:
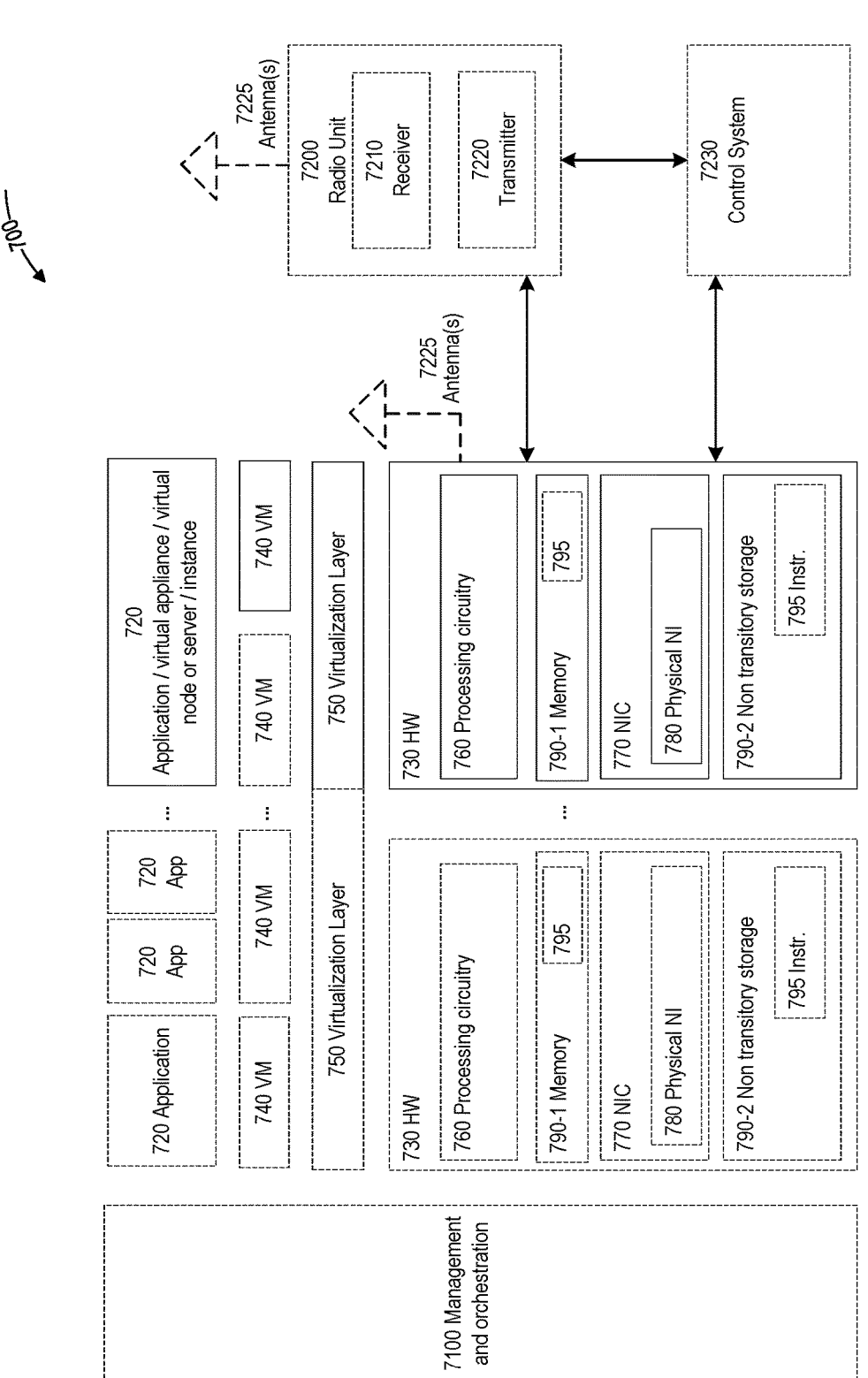
FIG. 7 shows an example virtualization environment associated with activating positioning SRS during DRX inactive time, according to various aspects of the present disclosure.

FIG. 7 is a schematic block diagram illustrating a virtualization environment 700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 700 hosted by one or more of hardware nodes 730. Further, in embodiments in which the virtual node is not a radio access node or does not require radio connectivity (e.g., a core network node), then the network node may be entirely virtualized.

The functions may be implemented by one or more applications 720 (which may alternatively be called software instances, virtual appliances, network functions, virtual nodes, virtual network functions, etc.) operative to implement some of the features, functions, and/or benefits of some of the embodiments disclosed herein. Applications 720 are run in virtualization environment 700 which provides hardware 730 comprising processing circuitry 760 and memory 790. Memory 790 contains instructions 795 executable by processing circuitry 760 whereby application 720 is operative to provide one or more of the features, benefits, and/or functions disclosed herein.

Virtualization environment 700, comprises general-purpose or special-purpose network hardware devices 730 comprising a set of one or more processors or processing circuitry 760, which may be commercial off-the-shelf (COTS) processors, dedicated Application Specific Integrated Circuits (ASICs), or any other type of processing circuitry including digital or analog hardware components or special purpose processors. Each hardware device may comprise memory 790-1 which may be non-persistent memory for temporarily storing instructions 795 or software executed by processing circuitry 760. Each hardware device may comprise one or more network interface controllers (NICs) 770, also known as network interface cards, which include physical network interface 780. Each hardware device may also include non-transitory, persistent, machine-readable storage media 790-2 having stored therein software 795 and/or instructions executable by processing circuitry 760. Software 795 may include any type of software including software for instantiating one or more virtualization layers 750 (also referred to as hypervisors), software to execute virtual machines 740 as well as software allowing it to execute functions, features and/or benefits described in relation with some embodiments described herein.

Virtual machines 740, comprise virtual processing, virtual memory, virtual networking or interface and virtual storage, and may be run by a corresponding virtualization layer 750 or hypervisor. Different embodiments of the instance of virtual appliance 720 may be implemented on one or more of virtual machines 740, and the implementations may be made in different ways.

During operation, processing circuitry 760 executes software 795 to instantiate the hypervisor or virtualization layer 750, which may sometimes be referred to as a virtual machine monitor (VMM). Virtualization layer 750 may present a virtual operating platform that appears like networking hardware to virtual machine 740.

As shown in FIG. 7, hardware 730 may be a standalone network node with generic or specific components. Hardware 730 may comprise antenna 7225 and may implement some functions via virtualization. Alternatively, hardware 730 may be part of a larger cluster of hardware (e.g., such as in a data center or customer premise equipment (CPE)) where many hardware nodes work together and are managed via management and orchestration (MANO) 7100, which, among others, oversees lifecycle management of applications 720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 740 may be a software implementation of a physical machine that runs programs as if they were executing on a physical, non-virtualized machine. Each of virtual machines 740, and that part of hardware 730 that executes that virtual machine, be it hardware dedicated to that virtual machine and/or hardware shared by that virtual machine with others of the virtual machines 740, forms a separate virtual network elements (VNE).

Still in the context of NFV, Virtual Network Function (VNF) is responsible for handling specific network functions that run in one or more virtual machines 740 on top of hardware networking infrastructure 730 and corresponds to application 720 in FIG. 7.

In some embodiments, one or more radio units 7200 that each include one or more transmitters 7220 and one or more receivers 7210 may be coupled to one or more antennas 7225. Radio units 7200 may communicate directly with hardware nodes 730 via one or more appropriate network interfaces and may be used in combination with the virtual components to provide a virtual node with radio capabilities, such as a radio access node or a base station.

In some embodiments, some signalling can be effected with the use of control system 7230 which may alternatively be used for communication between the hardware nodes 730 and radio units 7200.

Figure 8:
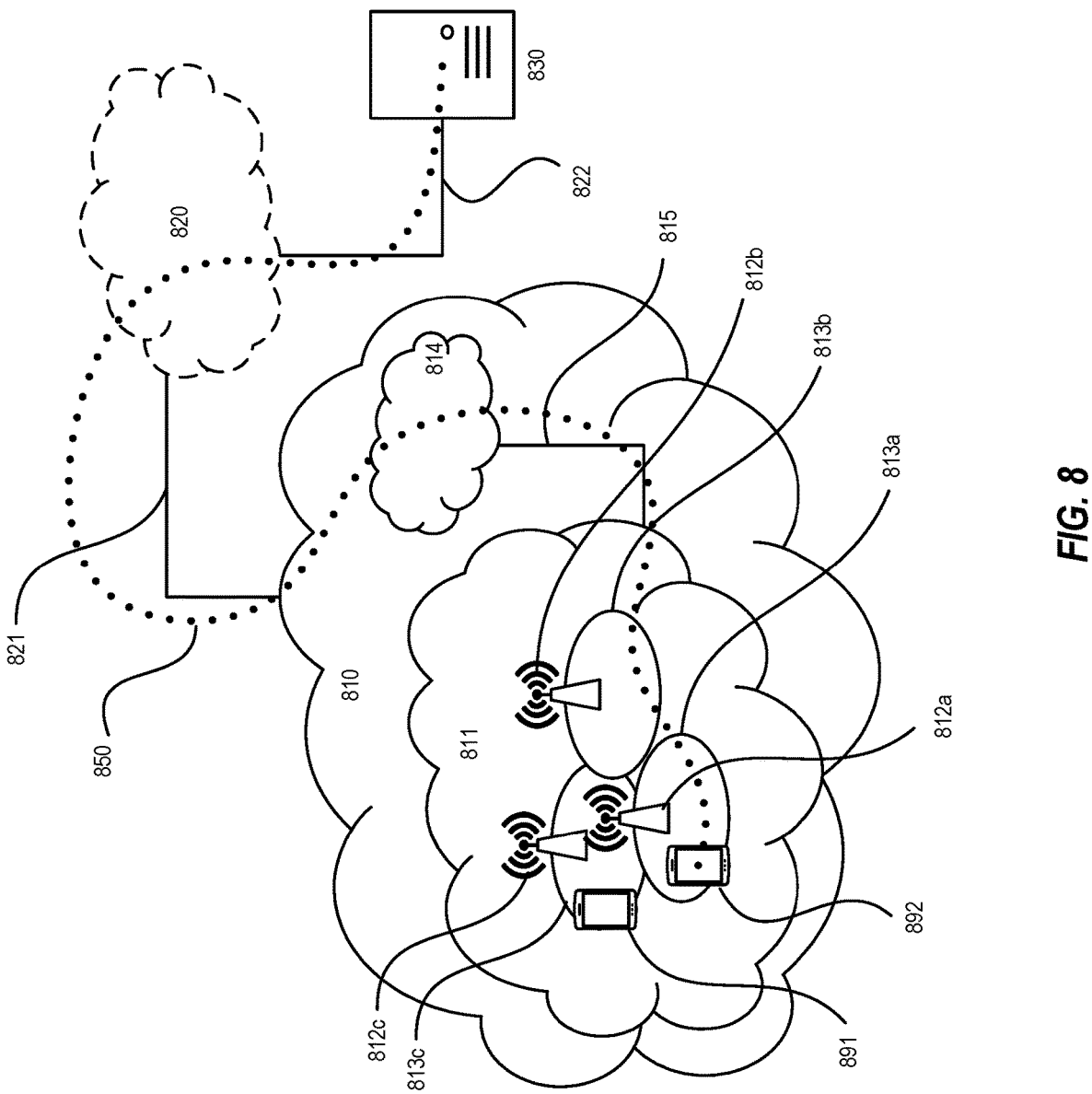
FIG. 8 shows an example communication system associated with activating positioning SRS during DRX inactive time, according to various aspects of the present disclosure.

With reference to FIG. 8, in accordance with an embodiment, a communication system includes telecommunication network 810, such as a 3GPP-type cellular network, which comprises access network 811, such as a radio access network, and core network 814. Access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to core network 814 over a wired or wireless connection 815. A first UE 891 located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider, or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more subnetworks (not shown).

The communication system of FIG. 8 as a whole enables connectivity between the connected UEs 891, 892 and host computer 830. The connectivity may be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 9. In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 9) served by base station 920. Communication interface 926 may be configured to facilitate connection 960 to host computer 910. Connection 960 may be direct or it may pass through a core network (not shown in FIG. 9) of the telecommunication system and/or through one or more intermediate networks outside the telecommunication system. In the embodiment shown, hardware 925 of base station 920 further includes processing circuitry 928, which may comprise one or more programmable processors, application-specific integrated circuits, field programmable gate arrays or combinations of these (not shown) adapted to execute instructions. Base station 920 further has software 921 stored internally or accessible via an external connection.

Communication system 900 further includes UE 930 already referred to. Its hardware 935 may include radio interface 937 configured to set up and maintain wireless connection 970 with a base station serving a coverage area in which UE 930 is currently located. Hardware 935 of UE 930 further includes processing circuitry 938, which may comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

Figure 9:
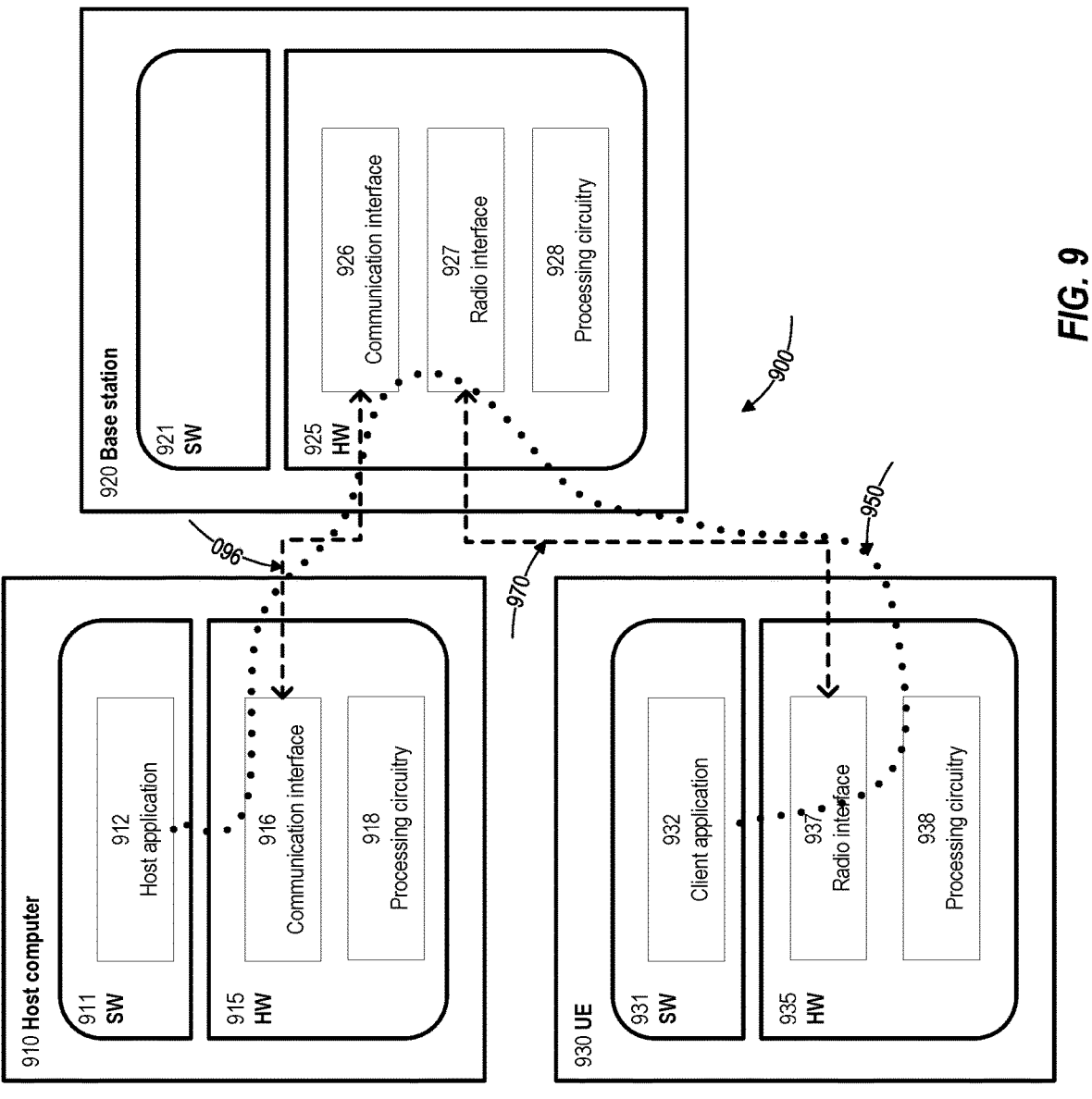
FIG. 9 shows an example communication system associated with activating positioning SRS during DRX inactive time, according to various aspects of the present disclosure.

It is noted that host computer 910, base station 920 and UE 930 illustrated in FIG. 9 may be similar or identical to host computer 830, one of base stations 812*a*, 812*b*, 812*c* and one of UEs 891, 892 of FIG. 8, respectively. This is to say, the inner workings of these entities may be as shown in FIG. 9 and independently, the surrounding network topology may be that of FIG. 8.

In FIG. 9, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, the teachings of these embodiments may improve the LATENCY and POWER CONSUMPTION and thereby provide benefits such as REDUCED USER WAITING TIME, BETTER RESPONSIVENESS, and EXTENDED BATTERY LIFETIME.

A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above, or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

Figures 10, 11, 12, 13:
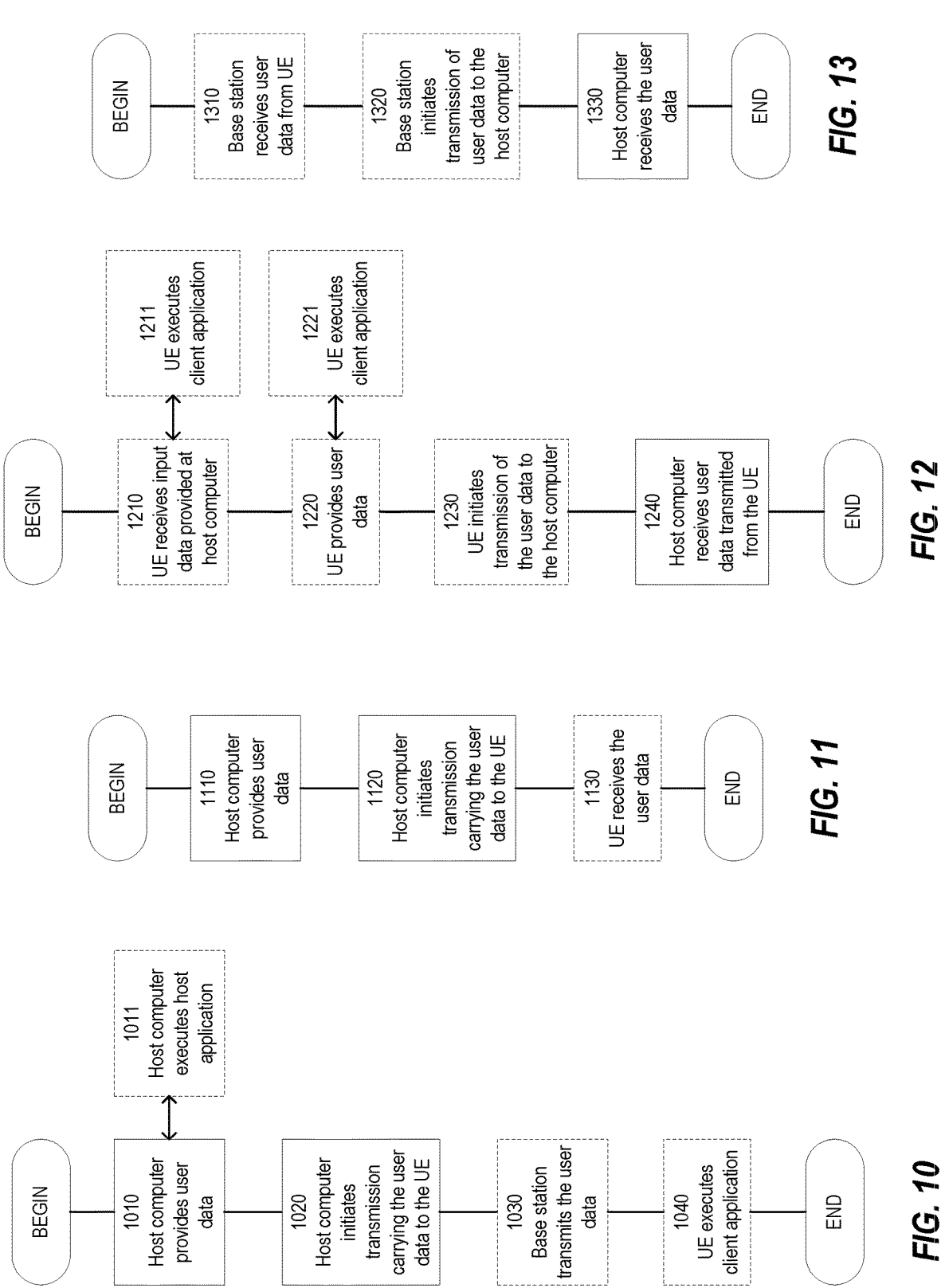
FIG. 10 shows an example process associated with activating positioning SRS during DRX inactive time, according to various aspects of the present disclosure.
FIG. 11 shows an example process associated with activating positioning SRS during DRX inactive time, according to various aspects of the present disclosure.
FIG. 12 shows an example process associated with activating positioning SRS during DRX inactive time, according to various aspects of the present disclosure.
FIG. 13 shows an example process associated with activating positioning SRS during DRX inactive time, according to various aspects of the present disclosure.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 1210 (which may be optional), the UE receives input data provided by the host computer. Additionally, or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

FIG. 14 is a flow chart of a method 140 performed by a wireless device, according to embodiments of the present disclosure. Embodiments of the method 140 may include the enumerated steps or operation and additional operations before, after, in between, or included in the enumerated operations. Some embodiments may include computer-readable instructions stored in memory and executable by a processor to cause the process to perform associated operations. As depicted, the method 140 may begin with an operation 142, in which the wireless device determines whether it is allowed to transmit a sounding reference signal (SRS) to a network node during the DRX inactive time. At an operation 144, the wireless device includes an operation of transmitting SRS to the network node during the DRX inactive time when it is determined that the wireless device is allowed to transmit the SRS to the network node during the DRX inactive time.

Embodiments of the method 140 may include operations of determining whether the network node can receive a sounding reference signal (SRS) during discontinuous reception (DRX) inactive time from the wireless device and transmitting SRS to the network node during the DRX inactive time when it is determined that the network node can receive the SRS during DRX inactive time.

FIG. 15 is a flow chart of a method 150 performed by a network node, according to embodiments of the present disclosure. Embodiments of the method 150 may include the enumerated steps or operation and additional operations before, after, in between, or included in the enumerated operations. Some embodiments may include computer-readable instructions stored in memory and executable by a processor to cause the process to perform associated operations.

An embodiment of the method 150 may include an operation 152 in which the network node or a processing device thereof determines whether it is capable of and/or configured to receive a sounding reference signal (SRS) during discontinuous reception (DRX) inactive time from a user equipment (UE). At an operation 154, the network node may utilize the determined information for one or more tasks.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors ("DSPs"), special-purpose digital logic, and the like. The processing circuitry may be configured to execute program code stored in memory, which may include one or several types of memory such as read-only memory ("ROM"), random-access memory ("RAM"), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present the present disclosure, it is to be understood that the terminology used herein is for the purpose of describing particular embodiments only and is not intended to be limiting of present the present disclosure. Unless otherwise defined, all terms (including technical and scientific terms) used herein have the same meaning as commonly understood by one of ordinary skill in the art to which present the present disclosure belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present the present disclosure. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g., ", which derives from the Latin phrase "exempli gratia," may be used to introduce or specify a general example or examples of a previously mentioned item, and is not intended to be limiting of such item. The common abbreviation "i.e.,", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present the present disclosure may be embodied in hardware and/or in software (including firmware, resident software, microcode, etc.) that runs on a processor such as a digital signal processor, which may collectively be referred to as "circuitry," "a module," or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the present disclosure. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present the present disclosure. All such variations and modifications are intended to be included herein within the scope of present the present disclosure. Accordingly, the above disclosed subject matter is to be considered illustrative, and not restrictive, and the examples of embodiments are intended to cover all such modifications, enhancements, and other embodiments, which fall within the spirit and scope of present the present disclosure. Thus, to the maximum extent allowed by law, the scope of present the present disclosure are to be determined by the broadest permissible interpretation of the present disclosure including the examples of embodiments and their equivalents, and shall not be restricted or limited by the foregoing detailed description.

What is claimed is:

1. A method performed by a wireless device, the method comprising:

receiving configuration information indicating a status associated with a reception, by a radio node, of a sounding reference signal (SRS) during a discontinuous reception (DRX) inactive time, wherein the status is determined based at least in part on a number of wireless devices associated with the radio node; and selectively transmitting, to the radio node, the SRS during the DRX inactive time based at least in part on the status.

2. The method of claim 1, wherein the radio node includes a base station.

3. The method of claim 1, wherein the receiving the configuration information includes receiving the configuration information from the radio node.

4. The method of claim 1, wherein the receiving the configuration information includes receiving the configuration information from a positioning node.

5. The method of claim 1, wherein selectively transmitting the SRS includes:

transmitting the SRS during the DRX inactive time when the status indicates that the radio node is receiving or can receive the SRS during the DRX inactive time, and refraining from transmitting the SRS during that the DRX inactive time when the status indicates that the radio node is not receiving or cannot receive the SRS during the DRX inactive time.

6. The method of claim 1, further comprising:

transmitting, to a positioning node, information indicating that the SRS is transmitted or can be transmitted during the DRX inactive time.

7. The method of claim 1, wherein receiving the configuration information includes receiving information indicating that the SRS is to be transmitted or can be transmitted during the DRX inactive time based at least in part on receiving a positioning reference signal (PRS) from the radio node.

8. The method of claim 1, further comprising:

receiving, from the radio node or a positioning node, location information indicating a location of the wireless device, the location information being based at least in part on a measurement associated with selectively transmitting the SRS during the DRX inactive time.

9. A method by a radio node, the method comprising:

determining a status associated with reception of a sounding reference signal (SRS) during a discontinuous reception (DRX) inactive time based at least in part on a number of wireless devices associated with the radio node;

transmitting, to a wireless device, configuration information indicating status associated with the reception, by the radio node, of the SRS during the DRX inactive time; and selectively receiving, from the wireless device, the SRS during the DRX inactive time based at least in part on the status.

10. The method of claim 9, wherein the radio node includes a base station.

11. The method of claim 9, wherein selectively receiving the SRS includes:

receiving the SRS during the DRX inactive time when the status indicates that the radio node is receiving or can receive the SRS during the DRX inactive time, and refraining from receiving the SRS during that the DRX inactive time when the status indicates that the radio node is not receiving or cannot receive the SRS during the DRX inactive time.

12. The method of claim 9, further comprising:

receiving information indicating that the SRS is transmitted or can be transmitted by the wireless device during the DRX inactive time.

13. The method of claim 9, wherein transmitting the configuration information includes transmitting information indicating that the wireless device is to transmit the SRS during the DRX inactive time based at least in part on receiving a positioning reference signal (PRS) from the radio node.

14. The method of claim 9, wherein transmitting the configuration information indicating the status includes:

transmitting the configuration information indicating that the radio node is receiving or can receive the SRS during the DRX inactive time, or transmitting the configuration information indicating that the radio node is not receiving or cannot receive the SRS during the DRX inactive time.

15. The method of claim 9, further comprising:

performing a measurement on the SRS received during the DRX inactive time; and transmitting, to a positioning node, measurement information associated with the measurement.

16. The method of claim 9, further comprising:

determining the status associated with the reception of the SRS during the DRX inactive time, the determining the status including determining that the radio node is not receiving or cannot receive the SRS during the DRX inactive time based at least in part on a threshold number of wireless devices being associated with the radio node.

17. The method of claim 9, further comprising:

transmitting, to a positioning node, information indicating that the SRS is transmitted or can be transmitted during the DRX inactive time.

18. A method by a positioning node, the method comprising:

transmitting, to a wireless device, configuration information indicating a status associated with a reception, by a radio node, of a sounding reference signal (SRS) during a discontinuous reception (DRX) inactive time, wherein the status is based at least in part on a number of wireless devices associated with the radio node;

receiving, from the radio node, measurement information associated with a measurement performed on an SRS received during the DRX inactive time; and transmitting, to the wireless device, location information indicating a location of the wireless device.

19. The method of claim 18, wherein the positioning node includes a location management function (LMF) node.

20. The method of claim 18, wherein transmitting the configuration information includes transmitting information indicating that the wireless device is to transmit the SRS during the DRX inactive time based at least in part on receiving a positioning reference signal (PRS) from the radio node.

21. The method of claim 18, wherein transmitting the configuration information indicating the status includes:

transmitting the configuration information indicating that the radio node is receiving or can receive the SRS during the DRX inactive time, or transmitting the configuration information indicating that the radio node is not receiving or cannot receive the SRS during the DRX inactive time.

22. The method of claim 18, further comprising:

receiving, from the radio node, measurement information associated with a measurement performed on the SRS during the DRX inactive time, wherein transmitting the location information includes transmitting the location information based at least in part on the measurement information.

23. The method of claim 18, further comprising:

receiving, from the wireless device, measurement information associated with a measurement performed on the SRS during the DRX inactive time, wherein transmitting the location information includes transmitting the location information based at least in part on the measurement information.

* * * * *